Feb. 5, 1952        W. G. HOELSCHER        2,584,963

FEED INDICATING DIAL FOR LATHE CARRIAGES

Filed Sept. 8, 1948        3 Sheets-Sheet 1

INVENTOR.
William G. Hoelscher
BY
Wood, Arey, Herron & Evans
ATTORNEYS.

Feb. 5, 1952      W. G. HOELSCHER      2,584,963
FEED INDICATING DIAL FOR LATHE CARRIAGES

Filed Sept. 8, 1948      3 Sheets-Sheet 2

INVENTOR.
William G. Hoelscher
BY
Wood, Arey, Herron & Evans
ATTORNEYS.

Feb. 5, 1952 W. G. HOELSCHER 2,584,963
FEED INDICATING DIAL FOR LATHE CARRIAGES
Filed Sept. 8, 1948 3 Sheets-Sheet 3

INVENTOR.
William H. Hoelscher
BY
Wood, Arey, Herron & Evans
ATTORNEYS.

Patented Feb. 5, 1952

2,584,963

UNITED STATES PATENT OFFICE 2,584,963

FEED INDICATING DIALS FOR LATHE CARRIAGES

William G. Hoelscher, Cincinnati, Ohio, assignor to The American Tool Works Company, Cincinnati, Ohio, a corporation of Ohio Application September 8, 1948, Serial No. 48,245

9 Claims. (Cl. 82—22)

1

This invention relates generally to machine tools and has particular reference to apparatus for indicating the longitudinal feed travel of a lathe carriage. More specifically, the invention relates to an arrangement of direct reading dials, mounted upon the carriage to indicate accurately the longitudinal position of the cutting tool relative to the work. Length reading mechanism of this kind is employed primarily in turning multiple diameter work pieces such as shafting, to locate with precision one or a series of shoulders lengthwise of the shaft.

The improved length reading dials are used either upon hand controlled lathes for special jobs, or with lathes which are equipped to duplicate work pieces at a production rate. For production operations, the lathe is equipped with the usual longitudinal stop dogs or other mechanism which automatically stops the carriage at the shoulders.

In setting up the lathe for automatic operation, the operator locates the carriage with the cutting tool at a reference point, for example one end of the work piece, sets the dials at zero, then feeds the carriage longitudinally until the dials indicate the dimension for the first shoulder, at which point the first dog is located. This procedure is repeated for each shoulder, and the dials are reset to zero as each shoulder is located, if the dimensions are to be taken from shoulder to shoulder. If overall dimensions are given, the operator takes his readings from the dial without resetting so that each successive shoulder is measured from the first reference point. The same procedure is followed in a hand operation except that the shoulders are formed directly in the work as the cutting operation progresses.

The present structure embodies a primary and a secondary length reading dial, correlated with each other by suitable gearing so that the primary dial indicates the overall carriage travel in inches and fractions of an inch while the secondary dial reads in thousandths of an inch. The carriage is equipped with a hand wheel for manual translation so that final precision adjustment may be made by careful manipulation of the hand wheel. In order to avoid accidents, an automatic interlock is provided which disconnects the hand wheel when the carriage is traversed by power, so that the hand wheel remains stationary. For convenience and efficiency, the secondary dial is mounted upon the hand wheel shaft and is located at the hub of the wheel; the dial and hand wheel rotate in unison although each is driven by a separate gear train. Thus,

2 the hand wheel may be operated with the dial rotating in unison to establish a micrometer setting of the carriage and cutting tool or the hand wheel may remain stationary during power traverse while the dial continues to indicate the carriage travel.

A primary object of the invention therefore has been to provide a structure which provides unitary rotation of the hand wheel and dial when the hand wheel is operated, but which permits the hand wheel to be disconnected automatically when the carriage is translated by power while the dial remains in constant driving connection with the carriage to indicate the true position of the cutting tool with reference to the work. The structure eliminates mistakes which tend to occur when the hand wheel and secondary dial are fixed relative to each other. In such cases the automatic interlock permits the carriage to be traversed without rotating the hand wheel and dial to indicate the travel, consequently the dial must be reset after power traverse. It will be apparent that the operator sometimes will fail to readjust the dial after power traverse, resulting in serious errors and work spoilage, since the dial will no longer indicate the true position of the cutting tool.

It is the concept of the present invention to provide a secondary micrometer dial mounted on the hand wheel shaft with duplicate independent gear trains operable to drive the dial and hand wheel in unison when the hand wheel is operated and with an automatic cluch interconnected with the power traverse control means so that the hand wheel gear train is disconnected when the carriage is translated by power, while the dial gear train is in permanent mesh with the apron gearing to indicate in all times the true relationship of the carriage to the work although the hand wheel remains stationary.

Another object of the invention has been to provide an exceptionally simple and compact gear train to establish a driving connection between the hand wheel and apron gearing for manual feed adjustment of the carriage and to utilize the same gearing to drive the secondary length reading dial in unison with hand wheel rotation.

A further object has been to provide a primary or overall length indicating dial and a secondary or vernier dial, both of which are in permanent driving connection with the carriage such that the true relationship of the cutting tool to the work is indicated at all times.

An additional object has been to provide a self-contained primary length reading dial unit which is adapted to be coupled directly into one of the apron gear train shafts as a detachable unit.

Further objects and advantages of the apparatus will be set forth in greater detail in the specification with reference to the accompanying drawings in which.

Figure 1:
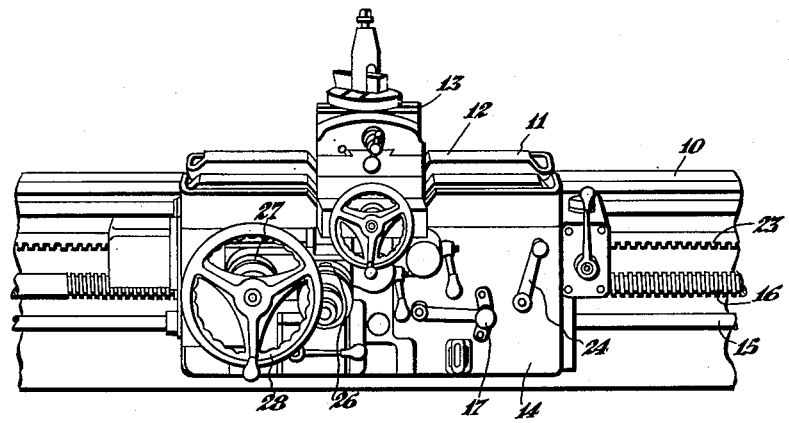
Figure 1 is a fragmentary perspective view of a lathe bed with the carriage mounted thereon, disclosing generally the environment of the present improvements.

Generally described with reference to Figure 1, the present apparatus is incorporated in a lathe having a bed 10, a carriage 11 slidably mounted on the ways of the bed by means of a saddle 12. A tool slide 13 is slidably mounted upon the saddle 12 and an apron 14 is secured at the forward edge of the saddle and extends downwardly at the front of the lathe bed. The lathe is provided with a power shaft or feed rod 15 and a lead screw 16. A gear train including bevel gears slidably keyed or splined to the feed rod, establishes a driving connection with the feed rod 15. A lever 17, mounted at the front of the apron, controls the apron gear train so that the carriage may be translated in the desired direction by power from the feed rod by moving the lever 17 to either direction from the neutral position shown.

Figure 2:
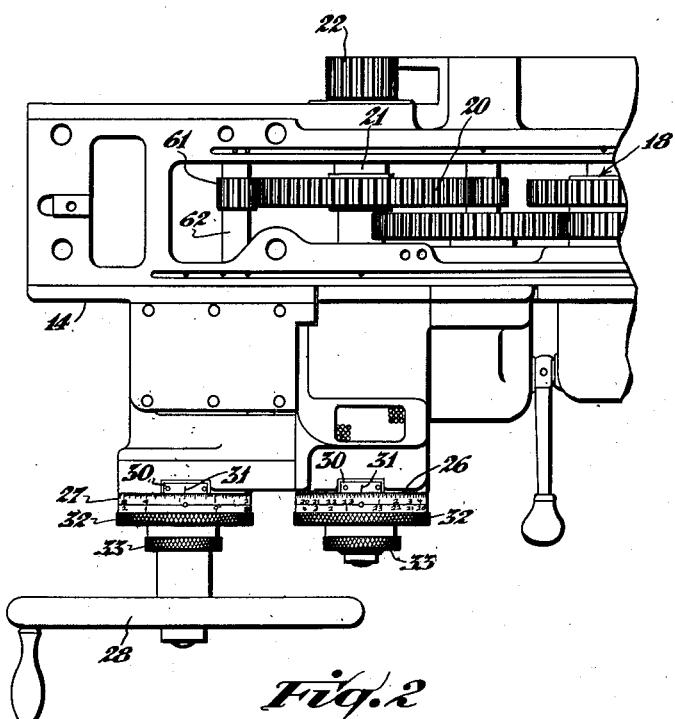
Figure 2 is an enlarged fragmentary top plan view of the lathe apron, removed from the carriage, illustrating generally the apron gear train and the length reading dials associated with the apron.

As shown in Figure 2, the feed rod gear train is indicated generally at 18. This gear train provides gearing (not shown) extending to the cross feed mechanism for the tool slide 13, and includes a large gear 20 keyed to a shaft 21. A rack pinion 22 is keyed to the inner end of shaft 21 and pinion 22 is in mesh with a rack 23 secured to the bed. Thus, when the gear train 18 is coupled to the feed rod 15, power is transmitted to pinion 22 to translate the carriage longitudinally at the selected speed.

The carriage may be fed longitudinally also by means of the lead screw 16 for certain classes of work. For this purpose, a driving engagement is established by means of a split nut (not shown) which is arranged to engage the screw shaft when the lead screw lever 24 is actuated. When the carriage is translated by the lead screw, pinion 22, being in mesh with rack 23, is caused to rotate, causing the large gear 20 and gear train 18 to idle. The length reading dials are in permanent driving connection with the large gear 20 so that whether the carriage is translated by the feed rod 15 or by the lead screw 16, the dials indicate accurately the longitudinal position of the carriage with reference to the work. The structure and operation of these dials will be more fully described at a later point in the specification.

*General arrangement of length reading dials*

As shown in Figure 2, the apron is equipped with a primary length reading dial indicated at 26 and a secondary or micrometer dial 27 adjacent the first and mounted upon the shaft of the carriage hand wheel 28. As shown, the primary dial indicates the feed of the carriage in inches and fractions of an inch; in the present arrangement one turn of dial 26 indicates 24 inches of carriage travel. The intermediate graduations are in eighths of an inch. The secondary dial 27 is graduated in inches and thousandths of an inch. One turn of dial 27 indicates one inch of carriage travel and each graduation on the dial indicates .005 of an inch. It will be noted that two sets of graduated scales are provided for each dial. In the instance of the primary dial 26, the numerals on the scales read from zero to twenty-three in either direction of rotation. In the instance of the secondary dial, the numerals on the scales run from zero to nine, also in either direction. Each dial is provided with an index plate 30 having a reference mark 31. By reason of this arrangement the operator may translate the carriage in either direction and take direct readings from the dials to determine accurately the distance of carriage movement.

It will be noted that each dial includes a knurled band 32 and a knurled hand nut 33. The nuts 33 permit the respective dials to be loosened with reference to their mounting shafts so that the dials may be rotated to a zero setting and clamped to the shafts. In practice, the operator may set the carriage with the cutting tool preferably at one end of the work or at a predetermined reference point, then sets both dials at zero. He then feeds the carriage longitudinally either by power or by the hand wheel 28 until the dials indicate the approach to the first shoulder. By operating the hand wheel in conjunction with the secondary dial 27, the operator is able to feed the carriage with precision according to the dial reading to the dimension for the first shoulder. At this point the operator may reset the dials to zero for the next dimension or he may proceed directly to the next shoulder if an overall dimension is given from the first reference point to successive shoulders. It will be apparent of course that the apparatus may be employed to establish the shoulders directly on the work or it may be employed to locate a series of longitudinal stop dogs along the bed if the lathe is being set up for a production job.

*Primary dial structure*

Figure 3:
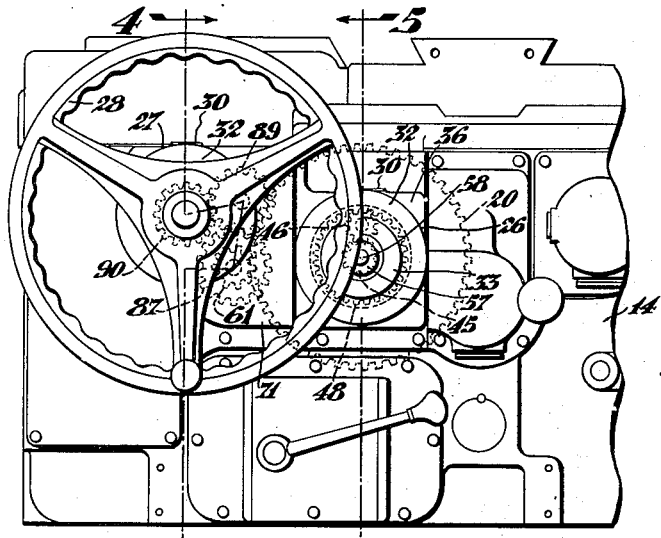
Figure 3 is an enlarged fragmentary front elevation of the lathe apron further illustrating the location of the length reading dials together with the gear trains for driving the dials.
Figure 5:
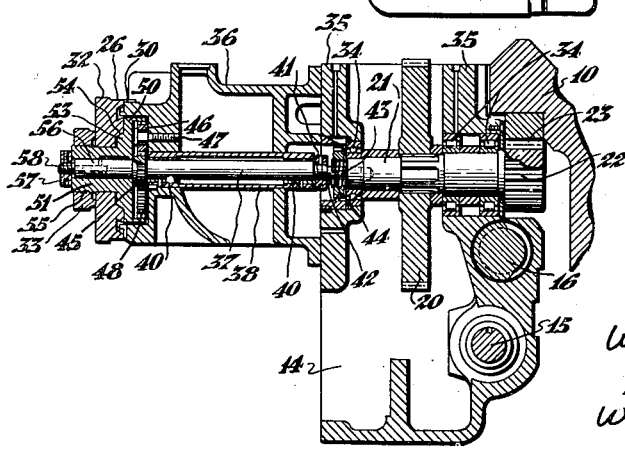
Figure 5 is a sectional view taken on line 5—5, Figure 3 illustrating the structural details and gearing of the primary apron length reading dial.

As shown in Figures 3 and 5, the large gear 20 is keyed to the shaft 21, as previously described with reference to the apron gear train. Shaft 21 is journalled in bearings 34—34 fitted in the walls 35—35 of the apron. The primary dial 32 is mounted upon the outer end of a casing 36 secured to the front of the apron and a drive shaft 37 for the dial is journalled in casing 36. This shaft is enclosed in a sleeve 38 which includes bushings 40 at opposite ends which provide bearings for the shaft 37. Sleeve 38 is fixed with reference to casing 36 and a collar 41 having a set screw is secured to the inner end of shaft 37 to maintain the shaft against longitudinal displacement relative to the sleeve. The sleeve arrangement thus provides independent bearings for shaft 37 so that the casing is a self-contained unit which may readily be installed on the apron. Shaft 37 is coupled to shaft 21 by means of a pilot shaft 42 (Figure 6) slipped into a bore formed in the end of shaft 21. A cross pin 43 establishes a driving connection with a slot 44 formed in the end of shaft 21 to couple shaft 37 to shaft 21.

Figure 6:
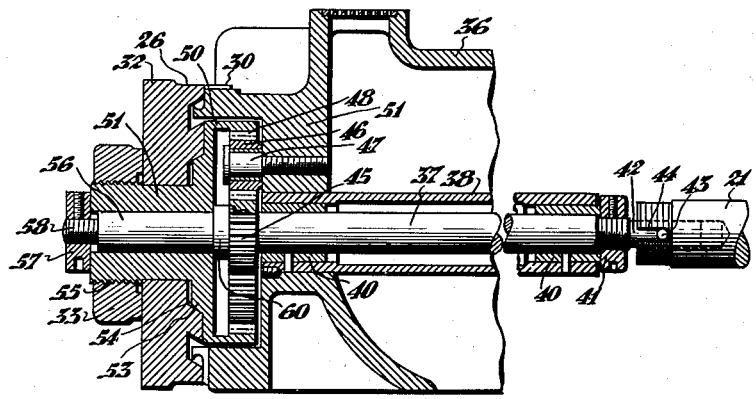
Figure 6 is an enlarged fragmentary sectional view similar to Figure 5 further detailing the gearing and clamping arrangement for the primary dial.

As shown in Figure 6, dial 32 is driven by means of a gear 45 keyed toward the outer end of shaft 37. An idler pinion 46, journalled on shoulder screw 47, meshes with an internal gear 48 forming a part of a dial clutch 50. The shoulder screw 47 is screwthreaded in the end wall 51 of casing 36. Dial clutch 50 includes a sleeve 51 upon which is loosely journalled the dial 26. A cone 53 is formed on clutch member 50 on the side opposite to gear 48, and the dial includes a conical counterbore 54 seated upon cone 53. The dial 26 is forced into clamping engagement with cone 53 by means of the knurled nut 33 which is screwthreaded as at 55 to the end of sleeve 51. It is to be noted that the clutch member 50 is loosely journalled upon the end 56 of shaft 37 so that the clutch sleeve may rotate at a differential speed with reference to the speed of shaft 37. The gear train, established from shaft 37, through gear 45, idler 46 and internal gear 48, is such that the dial rotates one revolution for each 24 inches of carriage travel, as previously noted. A lock nut 57 is screwthreaded upon the end 58 of shaft 37 to maintain the clutch sleeve 51 in longitudinal position against a counterturned abutment 60 formed on shaft 37.

*Secondary dial structure*

Figure 4:
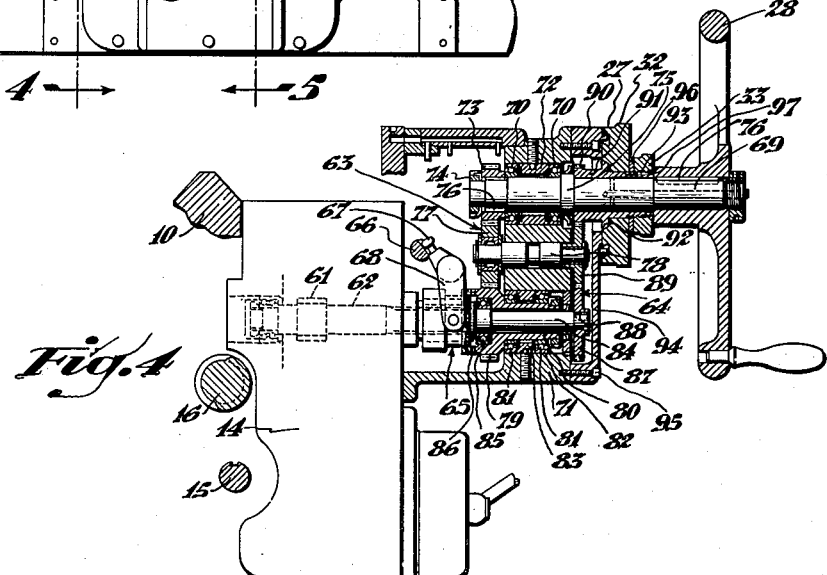
Figure 4 is a sectional view taken on line 4—4, Figure 3 detailing the gear train of the hand wheel and the secondary dial.

As shown in Figures 2, 3 and 4, the large gear 20 which drives rack pinion 22, meshes with a pinion 61 keyed to a shaft 62. Shaft 62 serves as a drive shaft from the hand wheel to gear 20 to feed the carriage by hand and serves also as a drive for the secondary indicating dial 27. The gear train from the hand wheel to shaft 62 is indicated generally at 63 and the gear train to the dial is indicated generally at 64 in Figures 4, 7 and 8. It will be noted that gears of trains 63 and 64 are of the same pitch diameter so that both gear ratios are the same. Thus, the hand wheel 28 and indicating dial 27 normally rotate in unison although each is driven by an independent gear train from a common source.

An automatically operated clutch collar, indicated generally at 65, disconnects gear train 63 from shaft 62 when the carriage is traversed by power. For this purpose an interlock is established between the lever 17 which controls the feed rod drive for the apron, and clutch 65. This arrangement includes a shaft 66 having a flat portion adapted to receive the end 67 of the clutch throwout yoke 68. It will be apparent that when shaft 66 is shifted in either direction from the neutral position shown, to connect the apron gear train to the feed rod, the clutch 65 will be shifted to the left to disconnect the gear train 63 from shaft 62. Thus, the hand wheel will remain stationary during power traverse of the carriage to avoid accidents, although the indicating dial 27 will continue to operate through gear train 64. The design of the interlock mechanism forms no part of the present invention, therefore it is not disclosed in detail. If the lathe is equipped with an individual motor for independent rapid traverse, shaft 66 is interconnected with the motor control lever so that the hand wheel remains stationary during power traverse in the same manner.

As detailed in Figure 4, the drive is established from hand wheel 28 to hand wheel shaft 69 which is journalled in ball bearings 70—70 fitted in the front wall of casing 71 which mounts dial 27. A spacer 72 is interposed between the bearing 70—70 to maintain them in position. A pinion 73 is mounted upon the inner end of shaft 69 and the shaft is maintained against longitudinal displacement by means of a lock nut 74. Nut 74 engages pinion 73 so that the shaft is maintained relative to the bearings 70—70 by means of pinion 73 and a counterturned abutment 75 formed on shaft 69. The hand wheel and pinion are keyed to shaft 69 as at 76—76. Pinion 73 meshes with an idler gear 77 loosely mounted on a shaft 78 mounted in the end wall of casing 71. Idler gear 77 meshes with a gear 79 formed as a part of sleeve 80 which is mounted upon ball bearings 81—81 fitted in a bore 82 formed in the end wall of casing 71. A spacer 83 is installed between bearings 81—81. A portion 84 of shaft 62 is loosely journalled in sleeve 80 upon a ball bearing 85 and drives the dial gear train 64 as hereinafter described.

Figure 8:
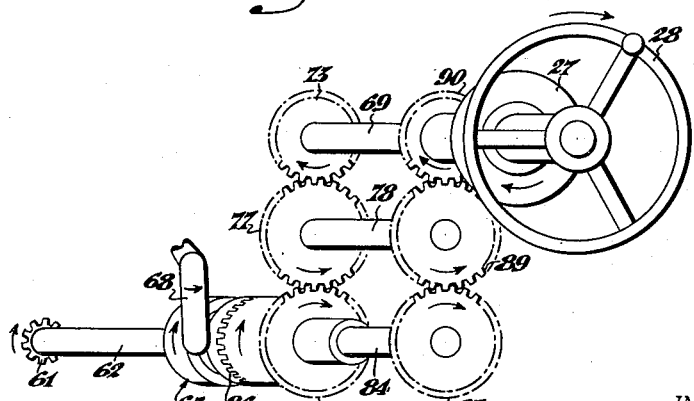
Figure 8 is a diagrammatic view similar to Figure 7 showing the operation of the apparatus with the hand wheel coupled to the gear train during hand traverse of the carriage showing both the dial and hand wheel in rotation.

When the hand wheel 28 is rotated, power is transmitted to gear 79 and to clutch collar 65 through clutch teeth 86, if the collar is in engaged position as shown in Figures 4 and 8. The clutch collar 65 is splined to shaft 62, therefore the drive continues to pinion 61 to drive the large rack gear 20 to translate the carriage by hand wheel rotation. This operation is disclosed diagrammatically in Figure 8 and it will be noted that by reason of the fact that the dial gear train 64 is keyed to the shaft 84 that both the dial and hand wheel are in rotation, thus the secondary dial indicates carriage travel by rotation of hand wheel 28. By reason of the common ratio of the gear trains 63 and 64, the dial and hand wheel rotate as a unit although each is driven by an individual gear train.

Figure 7:
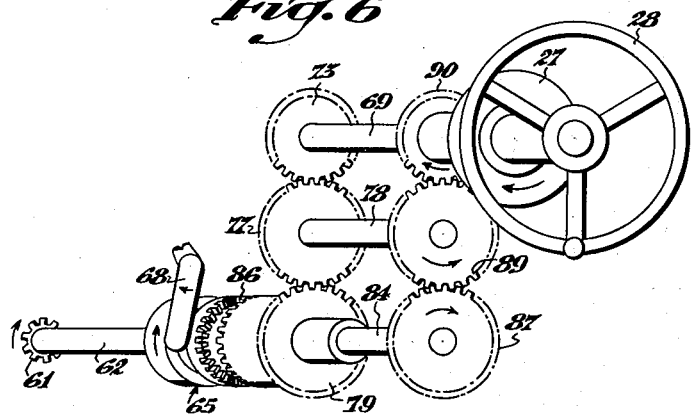
Figure 7 is a diagrammatic view illustrating the gear train for driving the primary length reading dial with the hand wheel gear train disconnected and the handwheel stationary during power transverse of the carriage and with the dial reading gear train in driving connection with the dial.

When the power traverse lever of the apron is actuated, clutch throwout yoke 68 will shift the clutch member 65 to the left as indicated in Figure 7, disengaging the teeth 86. As the carriage travels, rack pinion 22 is driven by the rack, causing rotation of large gear 20 and pinion 61 which is keyed to shaft 62. As shaft 62 rotates, it will drive dial gear 87 which is keyed as at 88 to the end of shaft 84 forming a part of shaft 62. Rotation of gear 87 is transmitted to idler gear 89 loosely journalled on shaft 78 and meshing with a dial drive gear 90. Gear 90 forms a part of dial driving clutch sleeve 91 which is loosely journalled upon hand wheel shaft 69. The sleeve 91 includes a cone 92 arranged to establish a frictional engagement with a cone recess formed in the dial 27 which is loosely journalled on the sleeve 91. The knurled nut 33, previously noted, is screw-threaded as at 93 to sleeve 91 so that the dial is pressed into frictional engagement with the clutch cone 92 when the nut is tightened. By loosening the nut 33, the dial may be rotated relative to sleeve 91 for setting purposes.

It will be apparent therefore, that since the hand wheel gear train 63 is disconnected from the shaft 62 by the clutch 65, the drive hand wheel remains stationary although shaft 62 is in rotation by reason of carriage travel. Since gear 87 is keyed to the extension 84 of shaft 62, a permanent driving connection is established with shaft 62 so that dial gear train 64 is rotated whenever the carriage is translated. The power translation from shaft 62 is illustrated diagrammatically in Figure 7 in which the rotation of gear train 64 is indicated to operate the dial 27 during carriage translation while the hand wheel and its gear train 63 remain stationary.

It will be noted in Figure 4 that a cover plate 94 is provided at the forward end of dial casing 72. The cover plate is secured to casing 71 by means of machine screws 95 and the cover plate encloses the gear train 64. The index plate 30 is secured to the upper surface of the casing 71 immediately adjacent the dial 27.

By virtue of the operation of clutch 65, the dial 27 is in permanent connection with the apron gear train so that the dial 27 at all times indicates the true position of the carriage with reference to the work in spite of the fact that hand wheel 28 is disconnected from the gear train for safety purposes. This arrangement provides safety, while at the same time it permits the micrometer dial to be associated with the hand wheel for direct observation as the operator manipulates the wheel to establish accurately the required setting for the work shoulders. By mounting the primary and secondary dials upon separate shafts, there is very little possibility of confusing the two. Thus, when the operator manipulates the hand wheel he is not likely to accidently refer to the primary or fractional reading dial because it is located to one side, away from his line of vision.

Since the micrometer or hand wheel dial 27 makes one revolution for each inch of carriage travel, there is a tendency, due to inertia, for the dial to continue to rotate when the carriage is stopped suddenly. This is sufficient to loosen the clamping nut 33 and disturb the dial setting when the dial is rotating in this direction, if the nut is frictionally engaged against the dial. To prevent this, a nonrotatable washer 96 is placed between the dial and nut. This washer includes a key engaged in a keyway or slot 97 formed in the driving sleeve 91. Thus, any turning force such as inertia, tending to rotate the dial when nut 33 is clamped, is resisted by the fixed washer 96 which frictionally engages the dial. This arrangement is unnecessary for the primary dial since it rotates at the rate of one turn for each twenty-four inches of carriage travel.

Having described my invention, I claim:

1. An apparatus for indicating and controlling the longitudinal translation of a lathe carriage or the like having power translating means, comprising; a hand wheel mounted on the carriage, a shaft for said hand wheel, a feed indicating dial loosely journalled on said shaft, gearing in said carriage operable to translate the carriage either by power or by operation of said hand wheel, a shaft extending from said gearing, a dial driving gear train including a gear permanently keyed to said extending shaft, said gear train being in driving connection with said indicating dial, a hand wheel gear train including a gear loosely journalled on said extending shaft, said hand wheel gear train being in driving connection with said hand wheel shaft, a clutch member on said extending shaft operable to couple said loosely journalled gear to said extending shaft, and automatic means operable to uncouple said clutch member when the power translating means is energized, to cause the hand wheel to remain stationary during translation while the dial rotates to indicate the length of translation.

2. A mechanism for regulating and indicating the longitudinal feed of a lathe carriage or the like having power translating means comprising; a hand wheel shaft journalled in said carriage, a hand wheel keyed to said shaft, an indicating dial loosely journalled on said shaft, gearing in said carriage operable to translate the carriage either by power or by rotation of said hand wheel, a shaft extending from said gearing, a hand wheel gear and a dial driving gear mounted upon said extending shaft, an idler shaft, respective idler gears mounted on said shaft and in mesh with said hand wheel gear and said dial driving gear, a hand wheel gear keyed to said hand wheel shaft and meshing with one of said idler gears, said indicating dial having a gear meshing with the other of said idler gears, a clutch member adapted to couple said hand wheel gear to said extending shaft, and automatic means operable to uncouple said clutch when the power translating means is energized to disconnect said hand wheel, said dial driving gear being keyed to said extending shaft to establish a permanent driving connection with said carriage gearing.

3. In a lathe having a bed, a carriage slidably mounted on the bed, a feed rod, apron gearing, and a control lever for coupling said gearing to said feed rod to translate the carriage, apparatus for measuring the travel of the carriage relative to the work comprising; a pair of dials having graduations to indicate the travel of the carriage, one of said dials arranged to indicate total carriage travel, the other of said dials being arranged to provide a micrometer feed indicator, a hand wheel on the carriage for translating the same by hand, said hand wheel having a driving shaft and a gear train meshing with said apron gear train to feed the carriage by hand, said micrometer dial being mounted loosely upon said hand wheel shaft, an independent gear train extending from said micrometer dial to said apron gearing, a clutch arranged to interconnect the hand wheel gear train with said apron gearing and an automatic interlock between the control lever for said apron gearing and said clutch operable to disengage the clutch of said hand wheel gear train when the apron gearing is coupled to the feed rod, said micrometer dial gear train being in permanent connection with said apron gear train, whereby the micrometer dial remains in connection with the apron gear train to indicate the true position of the carriage relative to the work.

4. In a lathe having a bed, a carriage, a feed rod, apron gearing arranged to be coupled to said rod to establish a driving connection therewith to translate the carriage, a feed indicating mechanism for said carriage comprising; a pair of indicating dials, one of said dials having a driving shaft in permanent connection with said apron gear train, a hand wheel adapted to translate the carriage, a shaft journalled in said carriage for mounting said hand wheel, drive means connected to said shaft and extending to said apron gearing, a secondary indicating dial mounted on said hand wheel shaft, a secondary drive means in connection with said secondary dial, automatic means for disconnecting the hand wheel drive means from said apron gearing when the carriage is translated by said feed rod, said secondary dial gear train being in permanent connection with the apron gearing to indicate the true position of the carriage upon the lathe bed, graduated scales on each of said dials, and clamping means operable to release said dials from their respective shafts whereby the respective dials may be set at a starting position to provide direct indication of carriage travel.

5. In a feed indicating mechanism for a lathe carriage or the like, having translating mechanism, a hand wheel, a mounting shaft for said hand wheel, a gear keyed to said shaft, a gear train connecting said gear to said carriage translating mechanism, a dial clutch member loosely journalled on said hand wheel shaft, a gear formed on said dial clutch member, a gear train connecting said gear to said carriage translating mechanism, a graduated dial loosely journalled on said dial clutch member and clamping means operable to clamp said indicating dial at selected setting relative to the clutch member.

6. In a feed indicating mechanism for a lathe carriage or the like having translating mechanism, a graduated indicating dial, a housing for said dial, a dial driving shaft journalled in said housing and in driving connection with said carriage translating mechanism, said dial being loosely journalled on said shaft, an internal gear concentric with the dial and in driving connection with said dial, an idler gear journalled in said housing and meshing with said internal gear, and a driving gear fixed to said shaft and meshing with said idler gear to rotate the dial to indicate the carriage travel when the carriage is translated.

7. In a feed indicating mechanism for a lathe carriage or the like having translating mechanism, a graduated indicating dial, a housing for said dial, a dial driving shaft journalled in said housing an in driving connection with said carriage translating mechanism, a dial clutch member loosely journalled on said shaft, an internal gear formed on said dial clutch member, an idler gear journalled in said housing and meshing with said internal gear, a driving gear fixed to said shaft and meshing with said idler gear to rotate the dial clutch member, said indicating dial being loosely journalled on said clutch member and clamping means operable to clamp the indicating dial at a selected setting relative to the clutch member.

8. In a mechanism for indicating and manually regulating the lonigtudinal feed travel of a lathe carriage or the like, a dial drive shaft, a dial driving sleeve loosely journalled on said shaft, a gear system connecting said sleeve to the carriage to rotate said sleeve in accordance with carriage travel, a dial loosely mounted on said sleeve, a clamping nut on said sleeve to lock the dial relative to the sleeve, and a member interposed between said clamping nut and dial, said member being slidably nonrotatably fixed to said sleeve to prevent loosening of said nut by dial inertia.

9. In a mechanism for indicating and manually regulating the longitudinal feed travel of a lathe carriage or the like, a dial drive shaft, a dial driving sleeve loosely journalled on said shaft, a gear system connecting said sleeve to the carriage to rotate said sleeve in accordance with carriage travel, a dial loosely mounted on said sleeve, a clamping nut on said sleeve to lock the dial relative to the sleeve, and a washer interposed between said nut and dial, said washer having a key and said sleeve having a keyway engaging said key to lock said washer against rotation whereby the turning force of the dial by inertia is resisted by said washer.

WILLIAM G. HOELSCHER.

REFERENCES CITED

The following references are of record in the file of this patent:

UNITED STATES PATENTS

| Number | Name | Date |
| --- | --- | --- |
| 909,623 | Lees | Jan. 12, 1902 |
| 1,282,821 | Harding | Oct. 29, 1918 |
| 1,867,453 | Harding | July 12, 1932 |
| 2,273,956 | Hall | Feb. 24, 1942 |
| 2,325,733 | Bickel | Aug. 3, 1943 |
| 2,336,163 | Bullard et al. | Dec. 7, 1943 |
| 2,354,372 | Groene | July 25, 1944 |